United States Patent [19]

Herr et al.

[11] Patent Number: 5,162,176
[45] Date of Patent: Nov. 10, 1992

[54] ELECTROCHEMICAL SECONDARY ELEMENT

[75] Inventors: Rudolf Herr; Detlev Hoge, both of Kelkheim; Rainer Bittihn, Idstein, all of Fed. Rep. of Germany

[73] Assignee: Varta Batterie Aktiengesellschaft, Hanover, Fed. Rep. of Germany

[21] Appl. No.: 781,094

[22] Filed: Oct. 22, 1991

[30] Foreign Application Priority Data

Jan. 19, 1991 [DE] Fed. Rep. of Germany ....... 4101533

[51] Int. Cl.$^5$ ............................................. H01M 6/14
[52] U.S. Cl. ................................. 429/194; 429/218
[58] Field of Search ................. 429/194, 196, 197, 218

[56] References Cited

U.S. PATENT DOCUMENTS

Re. 33,306  8/1990  Hayashi et al. ...................... 429/194
4,668,595  5/1987  Yoshino et al. ...................... 429/194

Primary Examiner—Anthony Skapars
Attorney, Agent, or Firm—Weiser & Stapler

[57] ABSTRACT

In a lithium secondary cell of the intercalation type, with a positive electrode which includes a lithiated transition metal oxide $Li_xM_yO_2$, wherein $0.5 \leq x/y \leq 1.0$ and M is a metal from Groups VIIb and VIIIb (preferably Co, Ni, Mn), and with a negative electrode formed of a carbon product with disordered crystalline structure produced from organic materials by delayed coking, both electrodes are uncharged in the initial assembly state, but the negative electrode is doped with lithium through prelithiation in an amount which is irreversibly consumed in the formation of ion conductive surface layers. This permits a loss-free deintercalation of any subsequently introduced lithium so that the cell exhibits, from its inception, a largely stable capacity during cyclic charge/discharge operation.

6 Claims, 1 Drawing Sheet

ELECTROCHEMICAL SECONDARY ELEMENT

BACKGROUND OF THE INVENTION

This invention relates to an electrochemical secondary element with a positive electrode having an active material which includes a lithium intercalating chalcogen compound of a transition metal, a negative electrode having an active material which includes a lithium intercalating carbon product, and a non-aqueous electrolyte.

Until recently, the utility of rechargeable lithium cells was limited in many fields because of the lack of cycling capability and high self-discharge. While weight and size of the cells would be greatly reduced, and thereby well adapted to current consuming devices, lithium cells principally remained as primary elements because their ability to be repeatedly recharged proved to be unsatisfactory.

A significant breakthrough in rechargeable lithium electrodes arose from the discovery of electron-conducting framework materials which are capable of intercalating and deintercalating lithium ions in their host lattice during alternate charging and discharging. The lithium electrode is replaced by an electrode formed of a Li-intercalation compound, but with the difference that the electrode reactions of the lithium electrode proceed largely reversibly via the host lattice-matrix, free from undesired side effects such as sludge or dendrite formation.

Japanese patent application (JP-A) 81-94788 discloses a lithium button cell in which graphite in the form of a pressed powder tablet constitutes the matrix of the negative lithium electrode. The tablet-shaped positive counter electrode consists of a transition metal oxide or sulfide. These compounds crystallize, for example, in layered lattices with relatively weak binding forces in the direction perpendicular to the layers, which permits a reversible insertion of lithium ions between such layers.

Thus, the charge/discharge operation of such a cell is carried out through the alternate charging (doping) of one electrode matrix with $Li^+$ ions and the discharging (undoping) of the other electrode matrix of $Li^+$ ions, which serve as the true electrochemically active ion species.

However, according to U.S. Pat. No. 4,668,595, graphite storage compounds are not stable in conjunction with organic electrolytes whereas, in place of graphite, certain carbon products which are obtained from organic polymer compounds through a delayed coking process are much more suitable as a carbon matrix. In referring to their disordered microcrystalline structure, such carbon products are also called turbostratic carbon materials (see F. Levy, "Intercalated Layered Materials", D. Reidel, Dorndrecht, Germany, 1979).

In combination with lithium intercalating transition metal oxides as the material of the positive electrode, it is possible to produce (using the above-named carbon electrolytes as well as a non-aqueous electrolyte based on a lithium salt) rechargeable lithium batteries in a charged state which exhibit rest potentials up to 4.5 volts. The construction of the cell takes place with uncharged electrodes, i.e. with Li-free carbon and a metal oxide doped with Li.

In another known button cell disclosed in U.S. Pat. No. Re. 33,306, the positive electrode is a Li-free metal oxide, i.e charged, in the initial assembly state. The negative electrode is formed as a carbon pressed body in close conductive contact with a lithium disk, and is also charged. By allowing the cell to stand, the carbon material becomes doped through self-discharge of the lithium in situ with $Li^+$ ions, so that upon subsequent charging of the cell when placed in operation, a lithium-containing carbon intercalate is formed.

SUMMARY OF THE INVENTION

It is the principal object of the present invention to provide a lithium secondary cell of the previously described type which exhibits stable cycling capacity from its inception.

This and other objects are achieved in accordance with the present invention by providing an electrochemical secondary element having a positive electrode with an active material which includes a lithium intercalating chalcogen compound of a transition metal, a negative electrode with an active material which includes a lithium intercalating carbon product produced with disordered lattice structures from organic substances by delayed coking, and a non-aqueous electrolyte wherein, upon initial assembly of the cell, the transition metal chalcogenide is loaded with lithium, and the carbon product is loaded through prelithiation with that quantity of lithium which can be irreversibly bound in the framework of the carbon product through chemical reaction.

In experimenting with lithium secondary cells of the intercalation type having electrodes assembled in the discharged state, it has now been found that in cyclic operation, after at most two cycles, the current yield drops to about 60% of its initial value. However, upon continued cycling, there is no further capacity reduction.

For further details regarding the electrochemical secondary element of the present invention, reference is made to the discussion which is provided below, taken together with the following illustrations.

DETAILED DESCRIPTION OF PREFERRED EMBODIMENTS

Figure 1:
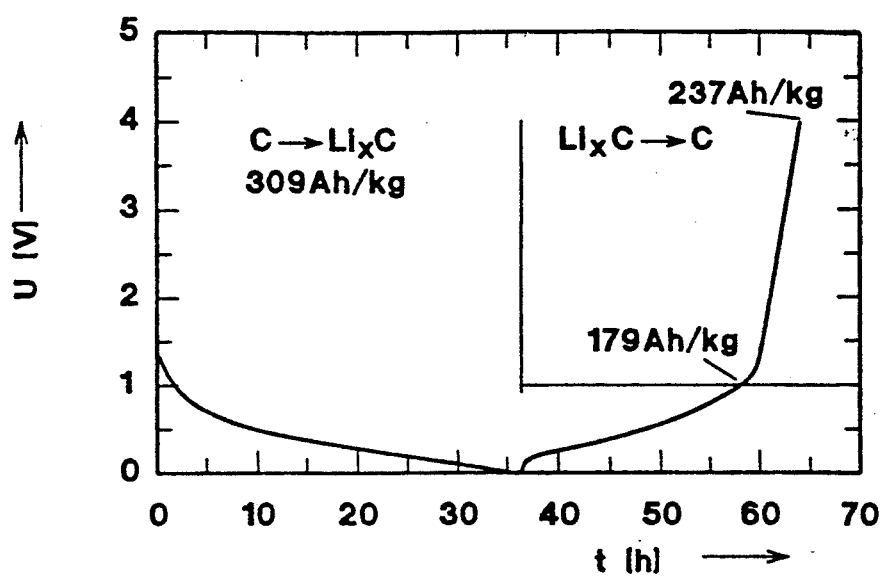
FIG. 1 is a graph which shows the potential variation of a $Li/Li_xC$-concentration chain during first-time charging and discharging.

In the secondary cell of the present invention, the positive electrode as well as the negative electrode are of the intercalation type, i.e. both electrodes are based on a framework material having a host lattice which alternately takes up and gives up lithium ions during charging and discharging.

The positive electrode includes a framework which is formed of a transition metal chalcogenide, preferably a transition metal oxide of the type $Li_xM_yO_2$ in the lithium-doped state, where $0.5 \leq x/y \leq 1.0$ and M is a metal from one of the Groups VIIb and VIIIb. Mixtures of metals from these groups are also usable. Preferably, M is one of the metals CO, Ni, Mn.

The negative electrode includes, as a host material or matrix for the electrochemically active lithium, a carbon product of the type obtained through a so-called "delayed coking process". Preferred for this intended purpose is a needle coke, such as is presently used in the steel industry. To be noted is that in contrast to graphite, with its orderly hexagonal layer lattice, the carbon used in accordance with the present invention exhibits a lattice structure with lattice planes which are highly defective in their orientation, and perturbed.

For more detailed information regarding such technology, including typical needle coke specifications, reference is made to H. M. Feintuch, J. A. Bonilla and R. L. Godino, "Handbook of Petroleum Refining Processes", R. A. Meyers, ed., McGraw Hill, New York, pages 7.1–7.61 (1986).

The cell's electrolyte is formed of a lithium salt, which is dissolved in a non-aqueous solvent. The usable lithium salts and solvents fully correspond to those which are employed in known lithium secondary cells. Particularly suitable for this purpose is an approximately 1 molar solution of $LiClO_4$ in propylene carbonate (PC).

The present invention contemplates that in the fully assembled and closed cell, the positive electrode is uncharged (i.e. doped with lithium) while the negative carbon electrode, through prelithiation, is doped only with so much lithium as is retained by the carbon matrix with the formation of a surface layer (i.e. through an irreversible chemical reaction with the carbon material), and does not participate in the transport processes of the charge/discharge operation.

In electrical experiments with lithium cells of the above-described type, with negative electrodes which initially incorporate a lithium-free needle coke, it has been found that in the first charge/discharge cycle of the cell, capacity declines to a substantial degree. However, in further cyclic operation, this reduced level remains nearly unchanged. Evidently, a certain quantity of lithium is withdrawn from the intercalation mechanism, upon its inception, through attachment to the surface of the chemically non-inert carbon product. The prelithiation step of the present invention provides a carbon electrode with a self-reactivity which is saturated to the extent that the intercalation and deintercalation of lithium in its host lattice can proceed quasi-loss-free, and therefore reversibly.

The quantity of lithium needed for this prelithiation depends on the specific surface of the carbon product and can therefore vary widely, generally between the limits of about 1% by weight and about 6% by weight, relative to the weight of the carbon. For the preferred needle coke, the quantity of dopant should be about 2% by weight to about 5% by weight. In practice, the prelithiation takes place by mixing the powdered carbon material with an appropriate quantity of lithium powder in an inert gas, or in a vacuum, or by introducing the lithium through electrochemical action.

The electrochemical secondary element of the present invention is further detailed by means of the following examples.

EXAMPLE 1

A mixture was made of 90% by weight needle coke and 10% by weight polyethylene (PE) powder. From this mixture, 64 mg was pressed into the lid of a button cell housing (dimensions of the button cell: 20 mm diameter; 1.6 mm height). A counter electrode formed as a lithium foil of a diameter of 15 mm and a mass of 14.0 mg was then placed into the cup portion of the cell. After the interposition between the electrodes of a microporous polypropylene (PP) separator which was wetted with 1.0 molar $LiClO_4$/PC electrolyte solution, the cell was closed.

During initial current loading of the cell with a constant current of 0.5 mA/cm$^2$, the carbon electrode became cathodic and the lithium foil became anodic. After a 36-hour current flow, the cell potential had dropped from the initial value of more than 1 volt to 0 volts, as shown in FIG. 1. This indicated the end of the loading of the carbon with lithium. The amount of current which flowed during the loading (C→$Li_xC$), namely 18 mAh, represents the capacity of the negative electrode for a needle coke content of 57.5 mg by weight. This corresponds to an equivalent capacity of 309 Ah/kg C.

By reversing the current direction, the lithium intercalation was reversed and, until a cell potential of 1.0 volt was reached, an equivalent of 179 Ah/kg C was released. When a cell potential of 4.0 volts was reached, an equivalent total of 237 Ah/kg C was released. Compared to the quantity of current utilized in the first loading, the current yield was only 77%. Accordingly, about 23% of the quantity of lithium initially transported into the carbon framework became irreversibly attached to the framework.

Figure 2:
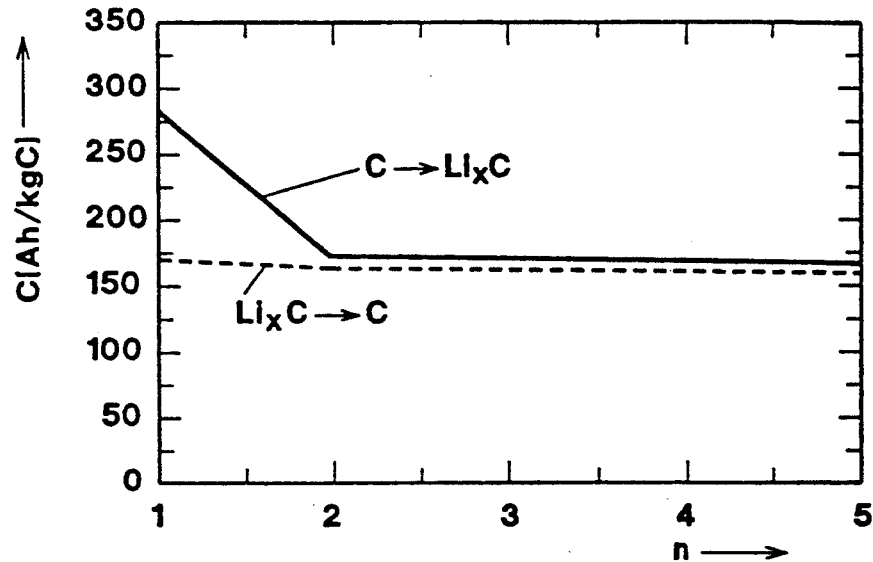
FIG. 2 is a graph which shows the capacity evolution of the concentration chain of FIG. 1 in cyclic operation.

FIG. 2 shows the capacity evolution of the above-described cell during charging (C→$Li_xC$) and discharging ($Li_xC$→C) in further cyclic operation (n=the number of cycles). As can be seen, up to the second cycle the capacity drops to about 60% of the initial level, but then remains constant.

EXAMPLE 2

Using a button cell housing for the lithium concentration chain, as in Example 1, a $Li_xC/Li_{0.5}MnO_2$ cell was produced as follows:

A mixture 1 was made of 5 g needle coke and 100 mg PTFE. From this mixture, 105 mg were taken and pressed into the housing lid, as the negative electrode material.

A mixture 2 was made of 90 parts by weight $LiMn_2O_4$ (produced by mixing $Li_2O_3$ and $MnCO_3$ in the molar relationship 1:4, tempering for 5 to 6 hours at 650° C., followed by tempering for 12 hours at 850° C. in air-flow), 4 parts by weight lamp black and 6 parts by weight PTFE. From this mixture, 220 mg were taken and pressed into the cup portion of the button cell housing, as the positive counter electrode. After the interposition of a polypropylene separator between the electrodes, and addition of 1.0 molar $LiClO_4$/PC electrolyte in a vacuum, the cell was closed. In that state, the cell was uncharged.

The cell was then charged with a current of 1 mA. Until reaching a cell potential of 4.3 volts, the charge accepted amounted to 23.2 mAh. In contrast, in subsequent cycles, only 11.6 mAh at a time became charged and again discharged. This capacity evolution is represented by the pair of curves (a) of FIG. 3. The capacity deficit which arose is attributable to the positive electrode.

EXAMPLE 3

A cell was produced by mixing 5 g needle coke, in argon, with 250 mg lithium powder, and tempering for 2 hours at 200° C. Thereafter, 0.5 g polyethylene (PE) powder were mixed in to obtain a final mixture 3. 115 mg of this mixture were then taken to form the negative electrode material of the cell. The composition of the positive electrode material was the same as mixture 2 (see Example 2) from which 220 mg were taken. Otherwise, assembly of the cell, and filling of the electrolyte (with 1.0 molar $LiClO_4/PC$) took place under the same conditions as in Example 2.

Figure 3:
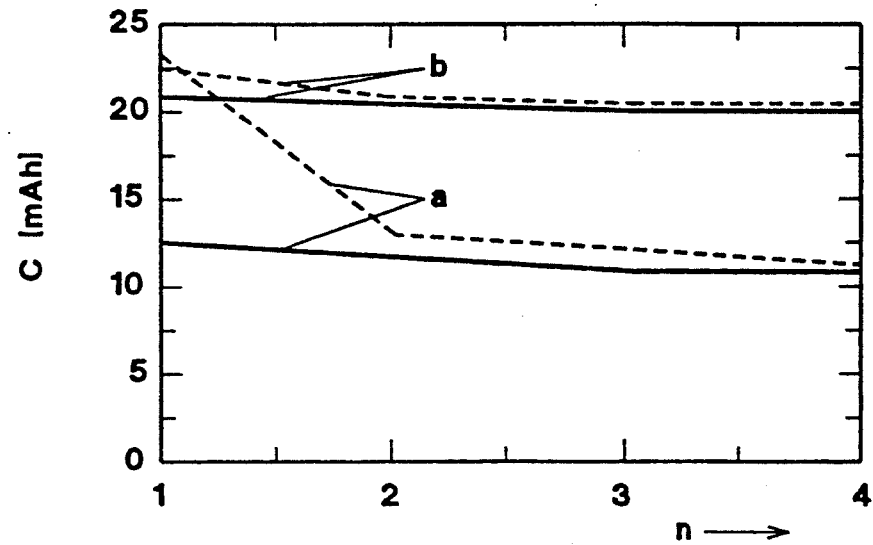
FIG. 3 is a graph which shows the capacity evolution in cyclic operation, of a Li secondary cell (b) produced in accordance with the present invention in comparison with a secondary cell (a) which is not produced in accordance with the present invention.

During the first charging, 23 mAh were taken up at a charging current of 1 mA until 4.3 volts was reached. During subsequent cycling, up to the second cycle the capacity dropped only slightly to 20.3 mAh, due to the prelithiated negative electrode, and then remained constant at that level in continued cyclic operation. FIG. 3 demonstrates this favorable cyclic behavior of the cell of the present invention (curve pair b) in comparison with that of a cell which does not incorporate the improvements of the present invention (curve pair a). The broken line curves respectively represent the charge acceptance C (mAh) of such cells, while the solid line curves represent the discharge yields relative to the number of cycles n.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An electrochemical secondary element comprising a positive electrode with an active material which includes a lithium intercalating chalcogen compound of a transition metal, a negative electrode with an active material which includes a lithium intercalating carbon product having disordered lattice structures produced from organic substances by delayed coking, and a non-aqueous electrolyte wherein, following initial assembly of the cell, the transition metal chalcogenide is loaded with lithium, and the carbon product is prelithiated with a quantity of lithium irreversibly bound in the carbon product through chemical reaction.

2. The electrochemical secondary element of claim 1 wherein the quantity of lithium bound in the prelithiated carbon product is from about 1% to about 6% by weight.

3. The electrochemical secondary element of claim 2 wherein the quantity is from about 2% to about 5% by weight of the carbon product.

4. The electrochemical secondary element of claim 2 wherein the positive active material is a lithiated transition metal oxide of the type $Li_xM_yO_2$, wherein $0.5 \leq x/y \leq 1.0$ and M is a metal selected from the group consisting of Groups VIIb and VIIIb, and mixtures thereof.

5. The electrochemical secondary element of claim 4 wherein M is a metal selected from the group consisting of CO, Ni and Mn.

6. The electrochemical secondary element of claim 1 wherein the carbon product is a needle coke.

* * * * *